Sept. 28, 1965            M. MASSOLO            3,208,295
DEVICE FOR MAINTAINING A CONSTANT ANGULAR
VELOCITY OF A ROTARY MEMBER
Filed June 14, 1962
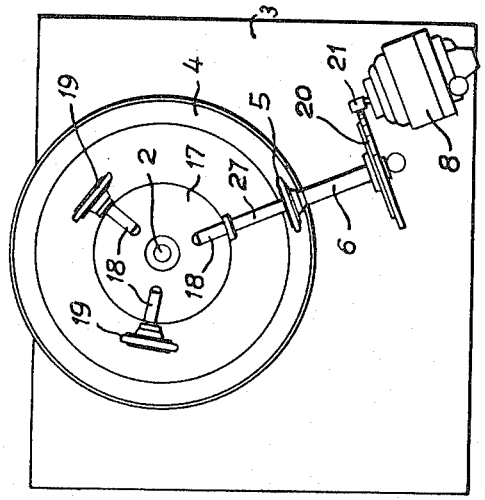
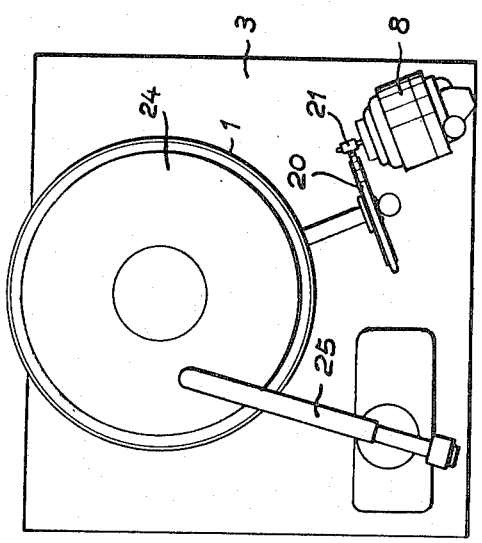
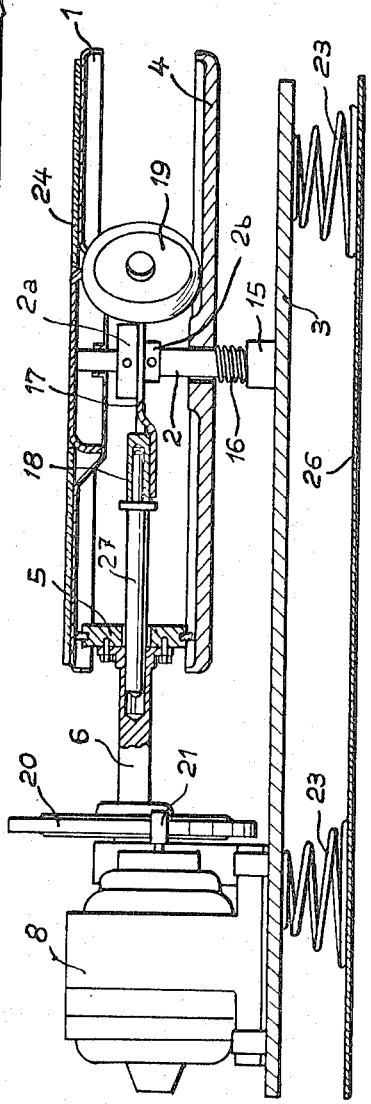

United States Patent Office 3,208,295
Patented Sept. 28, 1965

3,208,295
DEVICE FOR MAINTAINING A CONSTANT ANGULAR VELOCITY OF A ROTARY MEMBER
Mario Massolo, 12 Via Venasca, Turin, Italy
Filed June 14, 1962, Ser. No. 202,468
Claims priority, application Italy, Mar. 13, 1962, 15,959
4 Claims. (Cl. 74—206)

This invention relates to a device for maintaining a constant angular velocity of a rotary member, the rotational axis of which is carried by a frame subject to angular accelerations.

The device is more particularly intended for use in connection with apparatus adapted to be mounted on vehicles undergoing sharp variations in the direction of drive, comprising a rotary member, the angular velocity of which should be maintained constant, such as in record players and sound recorders.

The improved device is characterized by the fact that it comprises a stabilizer rotary member operatively connected with the rotary member to be stabilized, that is to the rotary member the angular velocity of which should be maintained constant.

The connection is such that the stabilizer member rotates in an opposite direction with respect to the rotary member to be stabilized.

The ratio of the moments of inertia with respect to the respective axes of rotation of the stabilizer member and member to be stabilized equals the reciprocal of the transmission ratio between the member to be stabilized, considered as the driving member, and the stabilizing member, considered as the driven member.

Further characteristic features and advantages of this invention will be understood from the appended detailed description with reference to the accompanying drawing given by way of an example, wherein:

FIGURE 1 is a plan view of a record player provided with the improved device;

FIGURE 2 is similar to FIGURE 1 with the turntable removed.

FIGURE 3 is a part sectional lateral view of FIGURE 1.

In the drawing, 1 denotes a rotary member to be stabilized, forming a turntable of a gramophone the speed of which, with respect to a supporting frame 3, should be maintained constant independently of angular acceleration of the frame.

The turntable 1 is adapted to support a record 24 on which a pick-up 25 may be lowered.

The turntable 1 is freely mounted on a pivot 2 fixed to the frame 3 and having a further freely mounted thereon disc 4 underlying the turntable 1, acting as a stabilizer member.

The pivot 2 is secured by means of a support 15 perpendicular to the frame 3, which is connected to the base plate 26 of the record player by means of resilient spring supports 23.

A coiled spring 16, wound around pivot 2, is compressed between the support 15 and disc 4.

A disc-shaped plate 17 is loosely mounted on the shaft 2 between two collars 2a, 2b fixed to the shaft 2 between the turntable 1 and the disc 4. The plate 17 carries three radial hollow arms 18 into which the shafts of three wheels are inserted.

Two of the abovementioned wheels, denoted by 19, are freely mounted on their shafts. The third wheel, denoted by 5, which is likewise loosely mounted on its shaft 27 is keyed to a shaft 6, driven from an electric motor 8 through a pair of cylindrical friction wheels 20, 21 keyed to the shaft 6 and shaft of the motor 8, respectively. The wheels 5 and 19 are each provided with a peripheral rim of rubber or similar material.

As the motor 8, transmission 20, 21 and shaft 6 are supported by the frame 3, the position of the support 17 remains fixed in respect of said frame, and in consequence the rotational axes of the wheels 5 and 19 must follow all movements of the frame 3.

The wheels 19 together with wheel 5 are adapted to keep the turntable 1 and disc 4 in a spaced parallel relationship. The spring 16 urges the disc 4 against said wheels. Also the turntable 1 bears by its weight on said wheels 5, 19, thus maintaining a frictional engagement between the rims of the wheels 5, 19 and the facing surfaces of the turntable 1 and disc 4.

In operation the wheel 5, constitutes a friction driving wheel, which receives motion from motor 8 through a drive comprising wheels 21, 20 and shaft 6, and rotates the turntable 1 and disc 4 in opposite directions at equal velocities.

With the above described structure the relative angular velocity of the turntable 1 with respect to the frame 3 is maintained constant, whereby relative angular accelerations are annulled, provided the moments of inertia of the turntable 1 and disc 4 respective their rotational axes are equal, and the wheels 5, 19, are maintained in a non-slip engagement with said turntable 1 and disc 4.

The device operates as follows. Upon switching of the motor 8, the driving wheel 5 rotates the turntable 1 and the disc 4 at the same speed but in opposite directions.

When the frame 3 is subjected to an angular acceleration, both the turntable 1 and the disc 4 tend to accelerate in a direction opposite to the direction of the acceleration applied to the frame 3.

As the moments of inertia of the turntable 1 and of the disc 4 are equal, the member rotating in the direction of the acceleration applied to the frame 3 tends to decrease its revolutions, and contemporaneously the other member, rotating in the opposite direction tends to increase its revolutions by this same amount.

However, as the turntable 1 and the disc 4 are kinematically connected by means of the friction wheels 5 and 19, mounted on axes fixed relatively to the frame 3, the turntable 1 and disc 4 are prevented from rotating at different speeds, and in consequence, the turntable 1 must rotate at a constant speed independently of the angular accelerations applied to the frame 3.

The embodiment described above does represent the simple form of carrying out into practice this invention as the moments of inertia of the turntable 1 and the disc 4 are identical; the angular velocities of said turntable 1 and disc 4 are also identical, owing to the connection between said turntable 1 and disc 4 operated by the friction wheels 5 and 19.

However, the invention covers also the case where the turntable 1 and the disc 4 have different moments of inertia, provided the kinematic connection between said turntable and disc, respectively, is such as to originate a transmission ratio between the turntable and the disc which is a function of the ratio between the respective moments of inertia according to the following description.

Broadly under the only simplifying limitation that the two discs 1 and 4, whichever their position, have their axes perpendicular to the plate 3 and assuming the transmission ratio afforded by the driving connection of the disc 1, or driven disc to be constant, the desired condition of a constant relative speed of the disc 1 with respect to the frame 3 imposes as a consequent condition a constant relative velocity of the disc 4 with respect to the frame 3.

The requirement for a constant relative angular velocity of the disc 1 with respect to the frame 3 implies annulment of the derivative of the said velocity, or relative angular acceleration of the disc 1 with respect to the frame 3.

Similarly, the relative angular acceleration of the disc 4 with respect to the frame 3 should be annulled.

The circumstance that the two relative accelerations of disc 1 and disc 4 with respect to the frame 3 should be annulled results in the absolute angular accelerations of the two discs 1 and 4 being not only the same, but equalling also the acceleration undergone by the frame 3.

These absolute accelerations of the discs 1 and 4 lead to inertial torques in the discs, each of which equals in modulus the product of the absolute angular acceleration by its respective moment of inertia.

These two inertia torques should compensate each other through the driving connection of the two discs to prevent arising of relative angular accelerations. Consequently, by writing the balance equation along the principle of virtual performances, the following formula is obtained:

$$I_2/I_1 = -1/T$$

wherein $I_2$ is the moment of inertia with respect to its axis of the stabilizer disc 4, $I_1$ is the moment of inertia with respect to its axis of the disc 1 to be stabilized and T is the transmission ratio afforded by the driving connection of the two discs.

Since $I_1$ and $I_2$ are constantly positive, T should be negative; that is, the discs 1 and 4 should be counter-rotating.

These discs can be arranged wherever desired on the frame, provided their rotational axes are parallel (or coincident).

From the motion of two of the three elements in the above formula, the third element can be obtained. For instance, upon knowing the shape and mass of the two discs, the transmission ratio to be supplied by the driving connection for correct operation of the device, can be determined. Similarly, upon knowing the mass and distribution thereof in the disc 1 to be stabilized and the transmission ratio supplied by the driving connection, the mass and shape of the stabilizer disc 4 can be determined.

What I claim is:

1. In a sound-reproducing apparatus which is movably mounted so as to be subject to angular accelerations, a record driving mechanism comprising a first flywheel for stabilizing the speed of a record, a second flywheel arranged coaxially to said first flywheel, means coupling the two flywheels to coaxially rotate simultaneously in opposite directions at a determined mutual transmission ratio, and said flywheels having moments of inertia with respect to their common axis of rotation which are related to each other by a ratio substantially equal to the reciprocal of said transmission ratio.

2. In a sound-reproducing apparatus which is carried by a frame subject to angular accelerations, a record driving mechanism comprising a first flywheel for stabilizing the speed of a record, a second flywheel arranged coaxially to said first flywheel, means coupling the two flywheels to coaxially rotate simultaneously in opposite directions at the same speed, and said flywheels having both substantially the same moment of inertia with respect to their common axis of rotation.

3. In a sound-reproducing apparatus, a record driving mechanism comprising a turntable for a record, a flywheel arranged coaxially to and axially spaced from said turntable, means interposed between the turntable and flywheel coupling the two to coaxially rotate in opposite directions at a determined mutual transmission ratio, and said turntable and flywheel having moments of inertia with respect to their common axis of rotation which stand to each other at a ratio substantially equalling the reciprocal of said transmission ratio.

4. In a sound-reproducing apparatus, a record driving mechanism comprising a turntable for a record, a flywheel arranged coaxially to and axially spaced from said turntable, a friction wheel interposed between the turntable and flywheel frictionally coupling the two to coaxially rotate in opposite directions, means axially urging the flywheel towards the friction wheel to maintain the frictional coupling of the flywheel and said friction wheel, motor means for driving the friction wheel, and said turntable and flywheel having substantially equal moments of inertia with respect to their common rotation axis.

References Cited by the Examiner
UNITED STATES PATENTS

| | | | |
|---|---|---|---|
| 456,654 | 7/91 | Jeppesen | 74—573 X |
| 933,945 | 9/09 | Aitken | 74—572 X |
| 1,076,219 | 10/13 | March | 74—572 |
| 1,329,867 | 2/20 | Wenderhold | 74—196 |
| 1,421,641 | 7/22 | White | 74—196 |
| 2,576,250 | 11/51 | Brubaker | 74—572 X |

BROUGHTON G. DURHAM, *Primary Examiner.*

DON A. WAITE, *Examiner.*